United States Patent [19]
Yee

[11] Patent Number: 5,962,845
[45] Date of Patent: Oct. 5, 1999

[54] DRIVE CIRCUIT FOR PHOTOELECTRIC SENSOR

[75] Inventor: Jimmy Yee, Allen, Tex.

[73] Assignee: Clarostat Sensors and Controls, Inc., El Paso, Tex.

[21] Appl. No.: 09/048,372

[22] Filed: Mar. 26, 1998

Related U.S. Application Data

[63] Continuation-in-part of application No. 08/914,331, Aug. 19, 1997, abandoned.

[51] Int. Cl.⁶ ...................................................... G05F 1/00
[52] U.S. Cl. ........................................ 250/214 R; 315/307
[58] Field of Search ........................ 250/214 R; 315/151, 315/200 A, 307

[56] References Cited

U.S. PATENT DOCUMENTS

| | | | |
|---|---|---|---|
| 3,895,255 | 7/1975 | Shimizu | 315/174 |
| 4,065,778 | 12/1977 | Harvey | 354/25 |
| 4,381,446 | 4/1983 | Fukuyama et al. | 250/214 R |
| 4,742,574 | 5/1988 | Smith et al. | 455/608 |
| 5,097,180 | 3/1992 | Ignon et al. | 315/200 A |
| 5,208,767 | 5/1993 | George-Kelso et al. | 364/563 |

*Primary Examiner*—Edward P. Westin
*Assistant Examiner*—Thanh X. Luu
*Attorney, Agent, or Firm*—Lorusso & Loud

[57] ABSTRACT

A drive circuit for a photoelectric sensor which automatically adjusts the sensor response time with adjustments in the drive current to the light source based on a desired sensing distance. The drive circuit includes an oscillator for establishing an output signal having an output frequency. An output of the oscillator is provided as an input to an adjustable current source. The current source is connected to the light source for providing the drive current to the light source at the output frequency. A peak detector is connected to a lead of the light source for detecting a feedback voltage proportional to the drive current through the light source. The feedback voltage is provided as an input to the oscillator, and the output frequency of the oscillator is variable depending on the feedback voltage so that variations in the drive current result in corresponding variations in the output frequency and, therefore, the frequency of the drive current. With the sensor of the present invention, a single sensor can provide a continuously variable response time based on the application.

20 Claims, 2 Drawing Sheets

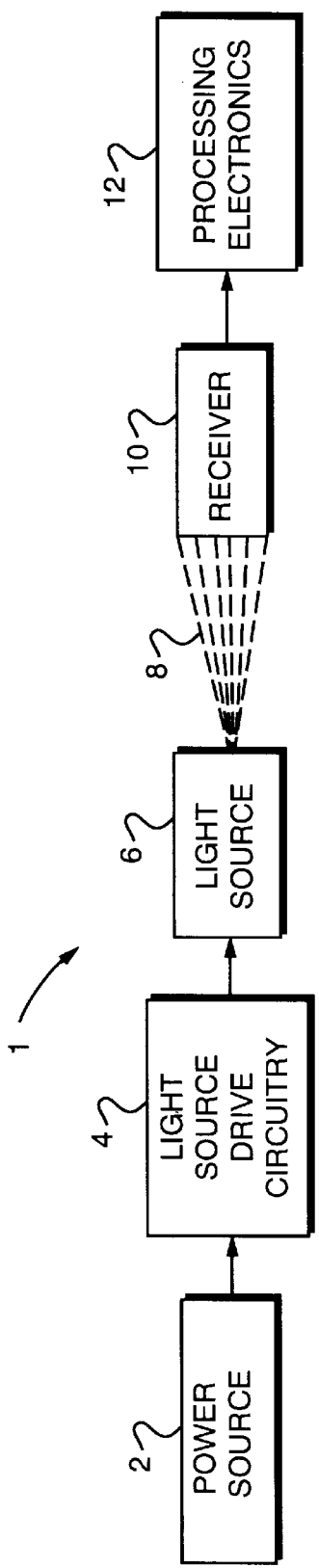
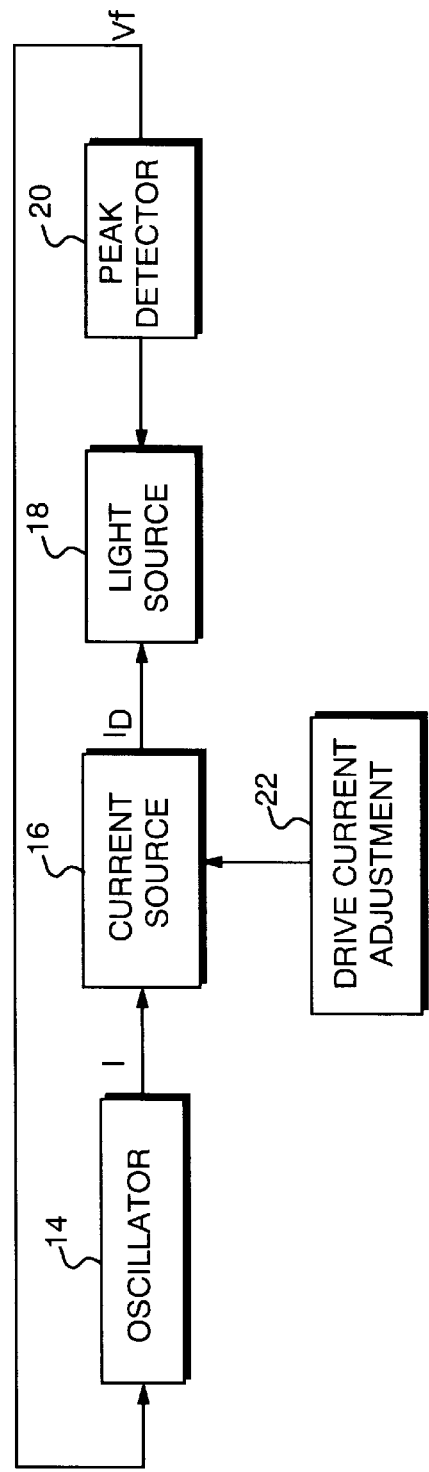

DRIVE CIRCUIT FOR PHOTOELECTRIC SENSOR

CROSS REFERENCE TO RELATED APPLICATIONS

The present application is a continuation-in-part of U.S. application Ser. No. 08/914,331, filed Aug. 19, 1997, now abandoned the teachings of which are incorporated herein by reference.

FIELD OF THE INVENTION

The present invention relates in general to photoelectric sensors, and in particular to a photoelectric sensor including a light source drive circuit which adjusts sensor response time based on the drive current to the sensor light source.

BACKGROUND OF THE INVENTION

Photoelectric sensors are used in many applications ranging from detecting the presence or absence of an object to high speed counting or edge detection applications. Photoelectric sensors use a light source or emitter, e.g. an LED, which is generally pulsed at high currents to achieve long scan distance and conserve power. An object is sensed by the reflectance or interruption of the serial stream of light pulses caused by the object. In order to ensure reliable detection of objects, especially at long distances or in situations where nearby objects provide stray reflections which appear as a background signal to the sensor, sensors are commonly designed so that a fixed number of received pulses in a given time period is required before the output of the sensor turns ON. The time delay associated with the turning ON or OFF of the sensor defines the response time of the sensor. Response time can range from tens of milliseconds to less than one microsecond.

The response time of a sensor is directly related to the sensing distance or range of the sensor, which can be less than an inch to several hundred feet. When long ranges are required, the internal power dissipation limits the speed of response. For example, a sensor with a rated scan distance of 10 feet typically has a 5 millisecond response time, and a sensor with a rated scan distance of 1 inch, typically has a 1 millisecond response time.

Photoelectric sensors of the modulated or pulsed type generally employ an oscillator to drive an LED light source at a low duty cycle and for setting the response time of the detection circuitry. In order to achieve long scan distances and not exceed the power dissipation rating of the LED, high currents are driven at low duty cycles. Currents up to several hundred milliamps can be driven without exceeding the continuous rating of the LED, which is usually 100 milliamps or less.

Additionally, because of the internal power dissipation, as higher pulse currents are driven through the LED to achieve long scan distances, the clock frequency or transmit frequency of the LED is slowed down. The result of slowing the clock frequency results in a longer response time of the photoelectric sensor, especially because multiple pulses are counted in the detector prior to the actual turn ON of the output.

Therefore, sensors are either designed to have long scan distances with slow response times or short scan distances and fast response times. A sensor for a particular application is, therefore, typically chosen or designed depending upon the particular sensing distance and response time required by the user.

To date, however, no photoelectric sensor has been developed which can provide a variable response time that changes with an operator adjustable sensing distance. Accordingly, there is a long felt need in the art for a photoelectric sensor drive circuit which automatically adjusts sensor response time based upon the drive current to the sensor light source required for a desired sensing distance.

OBJECTS OF THE INVENTION

Accordingly, a primary object of the present invention is to provide a drive circuit for a photoelectric sensor which adjusts the sensor response time based upon the drive current to the sensor light source required for the sensing distance of the application.

Yet another object of the present invention is to provide a a drive circuit for a photoelectric sensor which adjusts the sensor response time based upon the drive current to the sensor light source required for the sensing distance of the application and which is of a simple and cost-efficient design.

Still another object of the present invention is to reduce the cost associated with the design of systems including a photoelectric sensor by providing a drive circuit for a photoelectric sensor which adjusts the sensor response time based on the drive current to the sensor light source required for the desired sensing distance.

Yet a further object of the present invention is to provide a method of efficiently and reliably adjusting the response time of a photoelectric sensor for a desired sensing distance.

These and other objects of the present invention will become apparent from a review of the description provided below.

SUMMARY OF THE INVENTION

The photoelectric sensor according to the present invention is organized about the concept of providing a light source drive circuit which adjusts the sensor response time with adjustments in the drive current to the light source based on a desired sensing distance. When an operator adjusts the drive current to the light source to set the sensor for a desired sensing distance, a feedback voltage proportional to the drive current through the light source causes adjustment of the frequency of the drive current and, correspondingly, the sensor response time. With the sensor of the present invention, therefore, a single sensor can provide a continuously variable response time based on the application.

Specifically, the drive circuit of the present invention includes an oscillator for establishing an output signal having an output frequency. An output of the oscillator is provided as an input to a current source. The current source is connected to the sensor light source for providing the drive current to the light source at the output frequency of the oscillator, thereby establishing. The drive current magnitude establishes the sensor sensing distance, and the drive current frequency establishes the sensor response time.

A peak detector is connected to a lead of the light source for detecting a feedback voltage proportional to the drive current through the light source. The feedback voltage is provided as an input to the oscillator, and the output frequency is variable depending on the feedback voltage so that variations in the drive current magnitude result in corresponding variations in the output frequency and, therefore, the sensor response time.

In a preferred embodiment, a drive current adjustment, e.g. a potentiometer, is connected to the current source. The drive current adjustment allows adjustment of the magnitude of the drive current for thereby setting a desired light source output based on a desired sensing distance for the sensor. The peak detector preferably includes a series connection of a diode and a capacitor connected to the lead of the light source, and the feedback voltage is taken at the node between the diode and the capacitor.

The feedback voltage is provided across a series connection of a first resistive element, a second resistive element, and a capacitor for establishing the output frequency of the oscillator which is preferably a 555 IC timer. A trigger lead of the timer and a threshold lead of the timer are connected between the second resistive element and the capacitor. A discharge lead of the timer is connected between the first and second resistive elements. The timer is, thus, connected to provide an output signal having a frequency which depends on the feedback voltage.

The current source can take a variety of forms, but preferably is an adjustable voltage-controlled current source including first, second, and third solid state devices, e.g. transistors. Each of the solid state devices has conducting and non-conducting states, first and second terminals, e.g. emitter and collector, for conducting current in the conducting states, and a third terminal, e.g. a base, for controlling the conductive states.

The output signal of the oscillator is connected in series with the third terminal of the first solid state device. The second terminal of the first solid state device is connected in series with a combination of a diode and at least the third terminal of the second solid state device. The diode establishes a voltage at the third terminal of the second solid state device which is proportional to the reverse-bias diode voltage.

A potentiometer for providing an adjustable potentiometer resistance value is connected in series with a parallel connection of the first terminal of the second solid state device and the second terminal of the third solid state device. The third terminal of the third solid state device is connected to the second terminal of the second solid state device. The first terminal of the third solid state device is connected in series with the light source. With this arrangement, the magnitude of the drive current through the light source is proportional to the output signal of the oscillator and the potentiometer resistance value.

When the drive current of the light source is adjusted by adjustment of the potentiometer, the feedback voltage detected by the peak detector undergoes a corresponding variation. Since the output frequency of the 555 IC timer is proportional to the feedback voltage, the output frequency to the current source is automatically varied with adjustments to the magnitude of the drive current. Thus, when the drive current is reduced for a reduced sensing distance, the frequency of the drive current is increased for an decreased sensor response time. Conversely, when the drive current is increased for an increased sensing distance, the frequency of the drive current is decreased for a increased response time.

BRIEF DESCRIPTION OF THE DRAWING

For a better understanding of the present invention, together with other objects, features and advantages, reference should be made to the following description of the preferred embodiment which should be read in conjunction with the following figures wherein like numerals represent like parts:

FIG. 1: is a block diagram of a prior art thru-scan photoelectric sensor.

FIG. 2: is a block diagram at least a portion of a preferred embodiment of a drive circuit according to the invention.

DETAILED DESCRIPTION OF THE INVENTION

Figure 3:
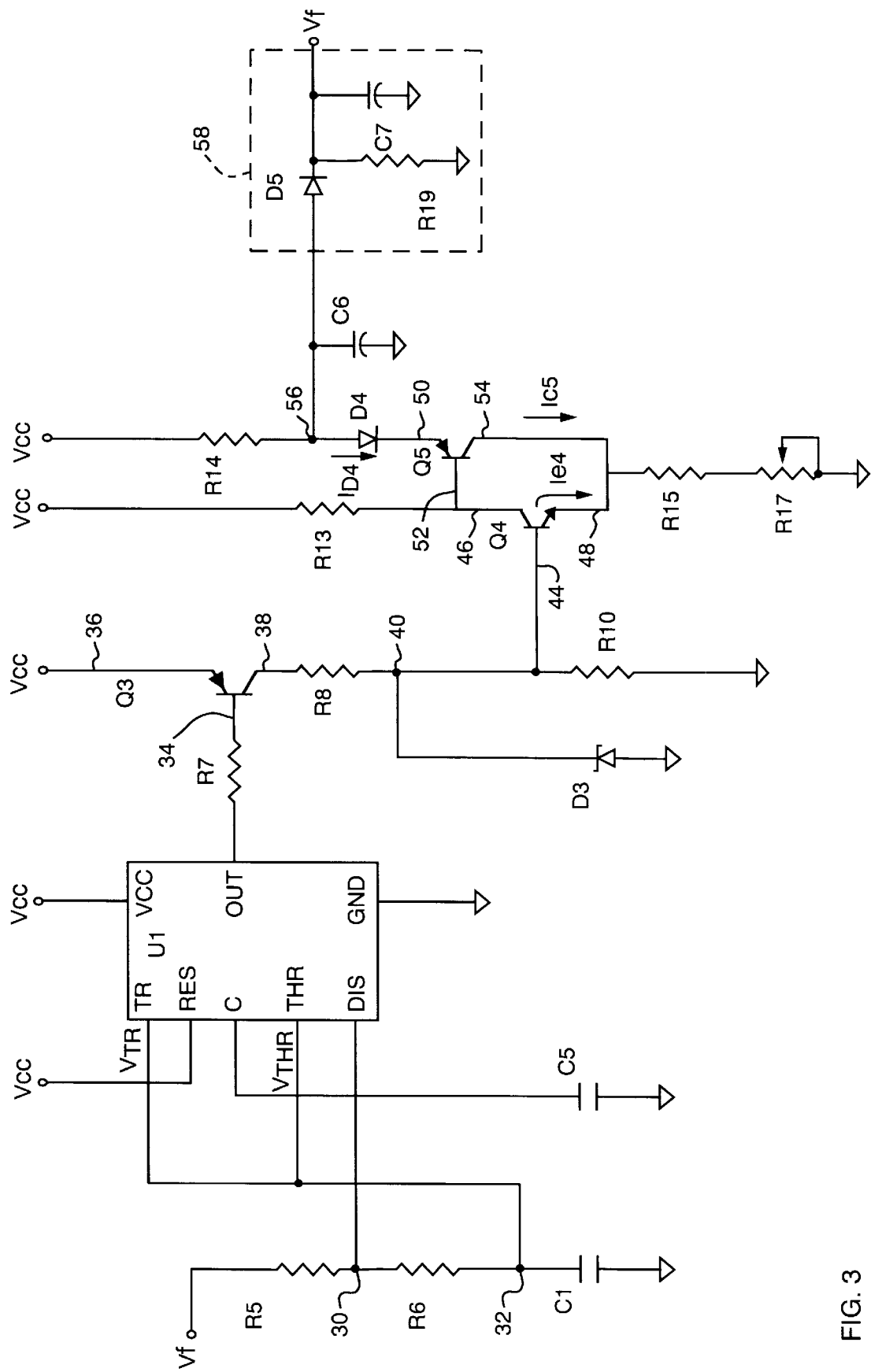
FIG. 3: is circuit diagram showing a preferred embodiment of a drive circuit according to the invention.

Referring now to FIG. 1, the present invention will be described in connection with its use in a thru-scan photoelectric sensor 1. It is to be understood that the invention would be equally useful in a wide variety of sensors including, retro-reflective, diffuse, and fiber-optic sensors.

As shown in FIG. 1, a common thru-scan photoelectric sensor generally comprises a power source 2 which provides input power to drive circuitry 4 for providing a drive current to a light source 6. Typically, the light source is a common and low-cost LED (light emitting diode). The light source 6 provides an output beam 8 of infrared or visible light. A receiver 10 is spaced from the light source at a desired sensing distance, and, when there is no object in the path of the light beam 8, senses the presence of the light beam from the light source.

The receiver then provides a signal to processing electronics 12 which indicates that it has received the light beam from the emitter and that, therefore, no object is present in the path of the beam. When an object is present in the path of the beam 8, however, the object blocks the beam from reaching the receiver 10. Upon this condition, the receiver provides a signal to the processing electronics 12 indicating that an object is present within the path.

The processing electronics 12 can perform a variety of functions depending upon the use for which the sensor is intended. For example, if such a sensor is used in connection with a mail sorter, the processing electronics would include a controlling mechanism to start some other activity within the machine, to detect a jam, or to stop another part of the machine when no further mail needs to be processed. Similar functions can be achieved when the sensor is used in various machines to detect the presence or absence of objects or to detect thickness or change in thickness in transparent/translucent objects.

According to the present invention the light source, e.g. the LED, of the photoelectric sensor is driven in a manner which provides a continuously variable response time that changes with the desired sensing distance of the sensor. An operator adjusts the drive current to the light source in a known manner, e.g. through a potentiometer, to achieve the appropriate light source output for the desired sensing distance. Advantageously, a feedback loop in the drive circuit causes an adjustment of the sensor response time based on sensing distance setting made by the operator. The drive circuit according to the present invention, therefore, overcomes the prior art limitations by allowing use of a single drive circuit with a response time which is variable with adjustments in the sensing distance, rather than requiring a separately designed drive circuit for each discrete sensing distance.

Turning now to FIG. 2, there is shown a block diagram of the basic elements of a drive circuit according to the invention. As shown, an oscillator 14 provides an output current I at an output frequency to a solid state current source 16 for pulsing a drive current $I_D$ to the light source 18 at the output frequency. The magnitude of the drive current to the light source and, therefore, the output of the light source, are adjustable by a drive current adjustment 22, e.g. a potentiometer.

A peak detector 20 is connected in the circuit for detecting an average voltage at a lead of the light source. The average voltage output of the peak detector 20, which is proportional to the magnitude of the drive current through the light source, is provided as feedback voltage $V_f$ to the oscillator 14 to cause the oscillator output frequency to vary in dependence of the light source drive current.

Thus, as the sensing distance is increased by operation of the drive current adjustment 22 to increase the drive current $I_D$ through the light source, the average voltage output of the peak detector falls. Accordingly, the input voltage to the oscillator and the output frequency of the oscillator falls and, correspondingly, a slower response time for the increased sensing distance is obtained. On the other hand, when the sensing distance is decreased by operation of the drive current adjustment, the drive current through the light source falls and the voltage output of the peak detector increases. As a result the output frequency of the oscillator increases and, therefore, a faster response time is achieved for the reduced sensing distance.

Turning now to FIG. 3, there is shown a preferred embodiment of a drive circuit according to the invention. Although FIG. 3 is shown having specific circuit elements such as a 555 IC timer, pnp and npn transistors, capacitors, an LED, etc., it is to be understood that a wide variety of circuit elements could be chosen by those skilled in the art in order to achieve the advantages of the present invention. In addition, those skilled in the art will recognize that some elements could be removed, added, or substituted with other elements while maintaining the ability to cause an adjustment of the sensor response time corresponding to an adjustment in the sensing distance using a feedback loop.

As shown, the 555 IC timer U1 is connected in a conventional way to establish a low duty cycle oscillator whose output OUT is used to drive a PNP transistor Q3. The feedback voltage $V_f$ from the peak detector 58, is provided across a series arrangement of resistors R5, R6 and capacitor C1. The trigger input TR and the threshold input THR of the timer are connected together and between R6 and C1 at node 32 to establish the trigger voltage $V_{tr}$ and threshold voltage $V_{thr}$ in dependence of the feedback voltage $V_f$ and the voltage divider provided by RS and R6. The discharge input DIS of the timer is connected between R5 and R6 at node 30 for charging and discharging the capacitor C1 through R6. The capacitor input C is connected in series with a capacitor C5 for filtering noise caused by the switching action of the timer U1. Finally, the active-low reset RES and the VCC inputs are connected to the a stable dc voltage Vcc, e.g. 5 VDC, and the ground input GND is connected to ground.

With this arrangement, it is believed that the output OUT of the 555 IC timer U1, has a frequency which can be derived from the charging equation across capacitor C1 as:

$$f = \frac{1}{R6C4\left(R5\ln\left(\frac{1}{1-\frac{2Vcc}{3Vf}}\right) - \ln 2\right)}$$

As can be seen from the above frequency expression, the output frequency of the timer depends directly on the feedback voltage $V_f$. As the feedback voltage increases, the output frequency decreases. On the other hand, as the feedback voltage decreases, the output frequency increases.

The output. OUT is provided as an input to the base 34 of pnp transistor Q3 through R7. The emitter 36 of Q3 is connected to the stable dc voltage Vcc, and the collector 38 is connected in series with R8 and a parallel combination of a zener diode D3, resistor R10, and the base 44 of Q4. As Q3 conducts, the reverse biasing of the zener diode D3 establishes a constant voltage at node 40 which is equal to the reverse-bias zener voltage of D3, e.g. 3.3 V.

The voltage at node 40, and at the base 44 of Q4, established by Q3 and D3 drives the combination of Q4 and Q5 to form a high-gain voltage controlled current source whose output is controlled by a fixed resistor R15 and potentiometer R17, i.e. the drive current adjustment, to provide current pulses to the LED D4 in a controlled manner. The emitter 48 of Q4 and the collector 54 of Q5 are connected in parallel to the series combination of R15 and the potentiometer R17. When Q4 conducts, the emitter voltage is the voltage at the base 44 of Q4 minus the $V_{BE}$ of Q4, e.g. 0.7 V. The emitter current $I_{e4}$ of Q4 and the collector current $I_{c5}$ of Q5 thus depend on the series resistance provided by R15 and R17. The collector 46 of Q4 is connected to Vcc through R13 and to the base 52 of pnp transistor Q5.

The emitter 50 of Q5 is connected in series with the light source D4 and to Vcc through R14. The emitter current of Q5, which is approximately equal to the collector current $I_{c5}$, is, therefore, the drive current $I_{D4}$ for the light source D4. A capacitor C6 is connected to the light source at node 56 to form a power supply decoupling network in connection with R14 to minimize the noise spikes on the DC power supply that would be generated each time the LED D4 turns ON and OFF. The values of R14 and C6 must be suitably chosen so that the voltage at the common node 56 will vary based upon the amount of charge pulled out of the capacitor C6. For example, if the capacitor C6 is extremely large and the current pulled out is small (short distance), the amount of voltage change across the capacitor C6 is negligible. Conversely, if the capacitor is small, and the charge pulled out of the capacitor is large (long distance), the voltage across C6 will drop significantly. Those skilled in the art will be capable to establishing the correct relationship between C6 and R14 for a particular design. In a preferred embodiment, however, C6 is 22 $\mu$F and R14 is 10 ohms with Vcc at 5 VDC.

Additionally, a series connection of a diode D5 and a parallel combination of a resistor R19 and a capacitor C7 are connected to the junction of the resistor R14 and a capacitor C6 of the decoupling network at node 56 to form the peak detector 58. The output $V_f$ of the peak detector is taken across the C6 and R19 and changes depending on the average voltage developed across the capacitor C6 of the decoupling network. The resistor R19 allows the feedback voltage $V_f$ to follow the change across C6 more rapidly.

In operation, by operating potentiometer R17 an operator controls the drive current $I_{D4}$ through the light source D4, and therefore the output of D4, based on the sensing distance required for the particular application. For long sensing distances where high output from the light source is required, the operator decreases the resistance of R17 to increase the current through D4. Conversely, for short sensing distances where low output from the light source is required, the operator increases the resistance of R17 to decrease the current through D4.

Advantageously, as the pulse current through the LED D4 increases by decreasing the resistance of the potentiometer R17 to provide for a longer scan distance, the average voltage $V_f$ developed across the capacitor C7 of the peak detector falls. This voltage $V_f$ is fed back to the R5, R6 and C1 timing components of the 555 timer U1. As can be seen from the expression set forth above for the frequency output of the 555 timer U1, as the voltage $V_f$ falls the output frequency of the timer falls. As the output frequency slows, the effective response time of the photoelectric sensor also slows. The amount of slowing of the frequency is, therefore, in direct proportion to the peak current driven through the LED D4. Thus, an adjustment of the sensor response time is automatically achieved upon adjustment of the light source drive current for a desired sensing distance.

Conversely, if the potentiometer R17 is increased in value, the magnitude of the pulse current through the LED D4 decreases to allow for a shorter scan distance. Additionally, because less current is required, the average voltage $V_f$ across the capacitor C7 of the peak detector increases. The increase in the average voltage provided as the feedback voltage $V_f$ to the timer U1 causes the frequency of the timer to increase to provide a faster sensor response time for the shorter sensing distance.

Thus, by providing a voltage feedback path to the oscillator circuit, the speed of response of the photoelectric sensor is continuously variable based upon the sensing distance required. Compared to the prior art, therefore, the circuit of the present invention eliminates the need for separately designed sensors for discrete sensor response times and sensing distances. The embodiments which have been described herein, however, are but some of the several which utilize this invention and are set forth here by way of illustration but not of limitation. For example, a wide variety of discrete and integrated circuit components could be used in the design of the sensor to achieve the advantages of the invention. It is obvious that many other embodiments, which will be readily apparent to those skilled in the art, may be made without departing materially from the spirit and scope of this invention.

What is claimed is:

1. A drive circuit for a photoelectric sensor which provides adjustment of sensor response time corresponding to adjustments in drive current to a sensor light source, said circuit comprising:
    an oscillator for generating an output signal having an output frequency which establishes said sensor response time,
    a current source connected to said light source for providing said drive current to said light source at said output frequency, said output signal of said oscillator being provided as an input to said current source; and
    a peak detector connected to a lead of said light source for detecting a feedback voltage proportional to said drive current through said light source;
    wherein said feedback voltage is provided as an input to said oscillator, and wherein said output frequency is variable depending on said feedback voltage so that variations in said drive current result in corresponding variations in said output frequency and said sensor response time.

2. A drive circuit according to claim 1, said circuit further comprising:
    a drive current adjustment connected to said current source, said drive current adjustment allowing adjustment of the magnitude of said drive current to said light source for thereby setting a desired light source output based on a desired sensing distance for said sensor.

3. A drive circuit according to claim 2, wherein said drive current adjustment comprises a potentiometer.

4. A drive circuit according to claim 1, wherein said peak detector comprises a series connection of a diode and a capacitor connected to said lead of said light source, and wherein said feedback voltage is at a node between said diode and said capacitor.

5. A drive circuit according to claim 1, wherein said oscillator comprises a 555 IC timer, and wherein said feedback voltage is provided across a series connection of at least one resistive element and a capacitor, a trigger lead of said timer and a threshold lead of said timer being connected between said at least one resistive element and said capacitor.

6. A drive circuit according to claim 1, wherein said oscillator comprises a 555 IC timer, and wherein said feedback voltage is provided across a series connection of a first resistive element, a second resistive element, and a capacitor, a trigger lead of said timer and a threshold lead of said timer being connected between said second resistive element and said capacitor.

7. A drive circuit according to claim 6, wherein a discharge lead of said timer is connected between said first and second resistive elements.

8. A drive circuit according to claim 1, wherein said current source comprises first, second, and third solid state devices, each of said solid state devices having conducting and non-conducting states, first and second terminals for conducting current in said conducting states, and a third terminal for controlling said conductive states;
    and wherein said output signal of said oscillator is connected in series with said third terminal of said first solid state device, said second terminal of said first solid state device being connected in series with a combination of a diode and at least said third terminal of said second solid state device;
    and wherein a potentiometer for providing an adjustable potentiometer resistance value is connected in series with a parallel connection of said first terminal of said second solid state device and said second terminal of said third solid state device, said third terminal of said third solid state device being connected to said second terminal of said second solid state device, said first terminal of said third solid state device being connected in series with said light source;
    and wherein said drive current through said light source is proportional to said output signal of said oscillator and said potentiometer resistance value.

9. A drive circuit according to claim 8, said circuit further comprising a capacitor connected to said lead of said light source, said capacitor discharging through said light source when said third solid state device is in said conducting state.

10. A drive circuit according to claim 8, wherein said first, second, and third solid state devices are bipolar junction transistors.

11. A drive circuit according to claim 10, wherein said first solid state device is a pnp bipolar junction transistor and said second solid state device is an npn bipolar junction transistor, and said third solid state device is a pnp bipolar junction transistor.

12. A drive circuit according to claim 10, wherein said first terminal of each of said first, second, and third transistors is an emitter, said second terminal is a collector, and said third terminal is a base.

13. A method of adjusting the response time in a photoelectric sensor having an adjustable drive current to a light source of the sensor comprising:
    providing a drive circuit for said light source, said drive circuit comprising:
        an oscillator for generating an output signal having an output frequency which establishes said sensor response time, a current source connected to said light source for providing said drive current to said light source at said output frequency, said output signal of said oscillator being provided as an input to said current source;

a drive current adjustment connected to said current source for adjusting the magnitude of said drive current for thereby setting a desired light source output based on a desired sensing distance for said sensor; and a peak detector connected to a lead of said light source for detecting a feedback voltage proportional to said drive current through said light source;

wherein said feedback voltage is provided as an input to said oscillator, and wherein said output frequency is variable depending on said feedback voltage so that variations in said drive current result in corresponding variations in said output frequency and said sensor response time; and operating said drive current adjustment to vary the magnitude of said drive current, said feedback voltage thereby causing variation in said output frequency and said sensor response time.

14. A method according to claim 13, wherein said drive current adjustment comprises a potentiometer.

15. A method according to claim 13, wherein said peak detector comprises a series connection of a diode and a capacitor connected to said lead of said light source, and wherein said feedback voltage is at a node between said diode and said capacitor.

16. A method according to claim 13, wherein said oscillator comprises a 555 IC timer, and wherein said feedback voltage is provided across a series connection of at least one resistive element and a capacitor, a trigger lead of said timer and a threshold lead of said timer being connected between said at least one resistive element and said capacitor.

17. A method according to claim 13, wherein said oscillator comprises a 555 IC timer, and wherein said feedback voltage is provided across a series connection of a first resistive element, a second resistive element, and a capacitor, a trigger lead of said timer and a threshold lead of said timer being connected between said second resistive element and said capacitor.

18. A method according to claim 17, wherein a discharge lead of said timer is connected between said first and second resistive elements.

19. A method according to claim 13, wherein said drive current adjustment comprises a potentiometer for providing an adjustable potentiometer resistance value, and wherein said current source comprises first, second, and third solid state devices, each of said solid state devices having conducting and non-conducting states, first and second terminals for conducting current in said conducting states, and a third terminal for controlling said conductive states;

and wherein said output signal of said oscillator is connected in series with said third terminal of said first solid state device, said second terminal of said first solid state device being connected in series with a combination of a diode and at least said third terminal of said second solid state device;

and wherein said drive current adjustment comprises a potentiometer for providing an adjustable potentiometer resistance value, said potentiometer being connected in series with a parallel connection of said first terminal of said second solid state device and said second terminal of said third solid state device, said third terminal of said third solid state device being connected to said second terminal of said second solid state device, said first terminal of said third solid state device being connected in series with said light source;

and wherein said drive current through said light source is proportional to said output signal of said oscillator and said potentiometer resistance value.

20. A method according to claim 19, said drive circuit further comprising a capacitor connected to said lead of said light source, said capacitor discharging through said light source when said third solid state device is in said conducting state.

* * * * *